(12) United States Patent
Mizukami et al.

(10) Patent No.: US 11,508,357 B2
(45) Date of Patent: Nov. 22, 2022

(54) EXTENDED IMPERSONATED UTTERANCE SET GENERATION APPARATUS, DIALOGUE APPARATUS, METHOD THEREOF, AND PROGRAM

(71) Applicant: NIPPON TELEGRAPH AND TELEPHONE CORPORATION, Tokyo (JP)

(72) Inventors: Masahiro Mizukami, Kyoto (JP); Ryuichiro Higashinaka, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 105 days.

(21) Appl. No.: 17/050,226

(22) PCT Filed: Apr. 5, 2019

(86) PCT No.: PCT/JP2019/015090
§ 371 (c)(1),
(2) Date: Oct. 23, 2020

(87) PCT Pub. No.: WO2019/208161
PCT Pub. Date: Oct. 31, 2019

(65) Prior Publication Data
US 2021/0104226 A1 Apr. 8, 2021

(30) Foreign Application Priority Data
Apr. 25, 2018 (JP) .............................. JP2018-083926

(51) Int. Cl.
*G10L 15/08* (2006.01)
*G10L 15/18* (2013.01)
*G10L 15/22* (2006.01)

(52) U.S. Cl.
CPC ........ *G10L 15/083* (2013.01); *G10L 15/1815* (2013.01); *G10L 15/1822* (2013.01); *G10L 15/22* (2013.01); *G10L 2015/088* (2013.01)

(58) Field of Classification Search
CPC .............. G10L 15/083; G10L 15/1815; G10L 15/1822; G10L 15/22; G06F 16/90332
(Continued)

(56) References Cited

U.S. PATENT DOCUMENTS 10,665,245 B2 * 5/2020 Seeker-Walker ....... G10L 17/02
11,195,524 B2 * 12/2021 Mukherjee .......... G10L 15/1815
(Continued)

FOREIGN PATENT DOCUMENTS

JP 2011-103018 A 5/2011

OTHER PUBLICATIONS

Higashinaka et al. (2010) "Collection of question answering pairs using " role play-based question answering" for dialogue system and application thereof", The Association for Natural Language Processing, Collection of presented papers of the 16-th annual meeting, Mar. 2010 with English translation generated by machine.

*Primary Examiner* — Susan I McFadden (57) ABSTRACT

An extended role play-based utterance set generation apparatus includes a first data store storing role play-based utterance sets and a second data store storing non-role-played utterance sets. The role play-based utterance sets include a first query and a role play-based response to the query. The non-role-played utterance sets include a second query and a non-role-played response to the query. The disclosed technology determines similarity between the role play-based response and the non-role-played response. Upon determining that the role play-based response is the same or similar to the non-role-played response, the disclosed technology generates an association between the role
(Continued)

play-based response and the second query and extends the role play-based utterance sets in the first data store with the second query.

7 Claims, 7 Drawing Sheets

(58) Field of Classification Search
USPC .......................................................... 704/270
See application file for complete search history.

(56) References Cited

U.S. PATENT DOCUMENTS 11,211,055 B2 * 12/2021 McConnell ............. G10L 15/22
2021/0117458 A1 * 4/2021 Higashi ............... G06F 16/3334

* cited by examiner

| UTTERANCE ID | QUESTION SOURCE ID | UTTERANCE |
|---|---|---|
| 1 | None | WHAT IS YOUR FAVORITE FOOD? |
| 2 | None | WHAT DO YOU WANT FOR DINNER TONIGHT? |
| 3 | 1 | I'D EAT ANYTHING AS LONG AS IT'S EDIBLE! |
| 4 | 2 | I'D EAT ANYTHING AS LONG AS IT'S EDIBLE! |
| 5 | 2 | OH BOTHER, YUZUKE IS FINE! |
| 6 | None | WHAT DO YOU THINK OF HIDEYOSHI? |
| 7 | 6 | LITTLE MONKEY IS QUITE A LOVELY FELLOW |

FIG. 3

| UTTERANCE ID | UTTERANCE 1 | UTTERANCE 2 |
|---|---|---|
| 1 | WHAT IS YOUR FAVORITE FOOD? | I'D EAT ANYTHING AS LONG AS IT'S EDIBLE! |
| 2 | WHAT DO YOU WANT FOR DINNER TONIGHT? | I'D EAT ANYTHING AS LONG AS IT'S EDIBLE! |
| 3 | WHAT DO YOU WANT FOR DINNER TONIGHT? | OH BOTHER, YUZUKE IS FINE! |
| 4 | WHAT DO YOU THINK OF HIDEYOSHI? | LITTLE MONKEY IS QUITE A LOVELY FELLOW |

| UTTERANCE ID | UTTERANCE 1 | UTTERANCE 2 |
|---|---|---|
| 1 | WHAT IS YOUR FAVORITE FOOD? | I'D EAT ANYTHING AS LONG AS IT'S EDIBLE! |
| 2 | WHAT DO YOU WANT FOR DINNER TONIGHT? | I'D EAT ANYTHING AS LONG AS IT'S EDIBLE! |
| 3 | WHAT WILL YOU EAT IF YOU ARE A BIT HUNGRY? | I'D EAT ANYTHING AS LONG AS IT'S EDIBLE! |
| 4 | WHAT DO YOU WANT FOR DINNER TONIGHT? | OH BOTHER, YUZUKE IS FINE! |
| 5 | WHAT IS THE NAME OF THIS FOOD? | OH BOTHER, YUZUKE IS FINE! |
| 6 | WHAT DO YOU THINK OF HIDEYOSHI? | LITTLE MONKEY IS QUITE A LOVELY FELLOW |

FIG. 7

EXTENDED IMPERSONATED UTTERANCE SET GENERATION APPARATUS, DIALOGUE APPARATUS, METHOD THEREOF, AND PROGRAM

CROSS-REFERENCE TO RELATED APPLICATIONS

This application is a U.S. 371 Application of International Patent Application No. PCT/JP2019/015090, filed on 5 Apr. 2019, which application claims priority to and the benefit of JP Application No. 2018-083926, filed on 25 Apr. 2018, the disclosures of which are hereby incorporated herein by reference in their entireties.

TECHNICAL FIELD

The present invention relates to a technique of a so-called example-based dialogue system (including a technique of generating an example to be used in the example-based dialogue system).

BACKGROUND ART

Unlike with conventional task-oriented dialogue, demand for a chat dialogue system aimed at dialogue itself increases. It is expected that the chat dialog system will be applied to entertainment and counseling, and will contribute to building of a trusting relationship between a user and a system through dialogue, as well as being a simple dialogue partner of a human.

As effort to improve entertainment property and a sense of intimacy of the chat dialogue system, there exists an "role play-based dialogue system" in which the chat dialogue system answers a question and responds to a chat of a user while role playing a predetermined character such as a specific character and historical figure (see, for example, Patent literature 1).

In the role play-based dialogue system, question answering data collected by a worker answering a question while role playing a predetermined character, is used. To collect question answering data with high quality, for example, a method disclosed in Non-patent literature 1 is used (see, for example, Non-patent literature 1).

PRIOR ART LITERATURE

Patent Literature

Patent literature 1: Japanese Patent Application Laid-Open No. 2011-103018

Non-Patent Literature

Non-patent literature 1: Ryuichiro Higashinaka (and two others), "Collection of question answering pairs using "role play-based question answering" for dialogue system and application thereof", The Association for Natural Language Processing, Collection of presented papers of the 16-th annual meeting, March 2010

SUMMARY OF THE INVENTION

Problems to be Solved by the Invention

In collection of question answering data using the method of Non-patent literature 1, because data can be collected from a plurality of workers, the method is favorable in collection efficiency per hour, and requires low cost per worker.

However, it still involves a significant cost to collect question answering data so that the role play-based dialogue system can answer various questions and can respond to various chats.

As an attempt to solve this problem, a method for combining an existing chat dialogue system with processing of converting a sentence into a way of speaking of a specific character or person has been proposed.

However, with this method, a content of a response depends on the chat dialogue system, and there is a possibility that personality of a speaker may not be reflected in a dialogue act and a content of utterance.

The present invention is directed to providing an extended role play-based utterance set generation apparatus for realizing a dialogue apparatus which conducts a dialogue in which personality of a predetermined character is reflected, with lower cost than a conventional apparatus, a dialogue apparatus which conducts a dialogue in which personality of a predetermined character is reflected, a method thereof, and a program.

Means to Solve the Problems

An extended role play-based utterance set generation apparatus according to one aspect of the present invention, includes a first storage part in which I role play-based utterance sets $i=(t_i(1), t_i(2))$ ($i=1, \ldots, I$) are stored, where two pieces of utterance of first utterance $t_i(1)$ and second utterance $t_i(2)$ which is associated with the first utterance $t_i(1)$ and which is made to the first utterance $t_i(1)$ while a predetermined character is role-played, are an role play-based utterance set i, and I is a predetermined positive integer, a second storage part in which J non-role-played utterance sets $j=(t'_j(1), t'_j(2))$ ($j=1, \ldots, J$) are stored, where two pieces of utterance of first utterance $t'_j(1)$ and second utterance $t'_j(2)$ which is associated with the first utterance $t'_j(1)$ and which is made to the first utterance $t'_j(1)$, are a non-role-played utterance set, and J is a predetermined positive integer, a non-role-played utterance set selecting part configured to select from the second storage, one or more non-role-played utterance sets j corresponding to the second utterance $t'_j(2)$ which is the same as or similar to the second utterance $t_i(2)$ of each role play-based utterance sets i read from the first storage, and an extended role play-based utterance set generating part configured to associate the first utterance $t'_j(1)$ of each of the selected non-role-played utterance sets j with the second utterance $t_i(2)$ of each role play-based utterance sets i to make an extended role play-based utterance set.

A dialogue apparatus according to one aspect of the present invention includes a storage part in which at least the extended role play-based utterance set generated by the extended role play-based utterance set generation apparatus according to is stored, and a response utterance generating part configured to generate response utterance for input utterance using the extended role play-based utterance set stored in the storage part.

Effects of the Invention

By generating an extended role play-based utterance set obtained by extending an role play-based utterance set using a non-role-played utterance set, it is possible to increase variation of utterance opportunities at which the role play-based utterance set can be utilized, at low cost. By this means, it is possible to realize a dialogue apparatus which conducts a dialogue in which personality of a predetermined character is reflected at lower cost than the conventional apparatus.

DETAILED DESCRIPTION OF THE EMBODIMENT

An embodiment of the present invention will be described in detail below. Note that the same reference numerals will be assigned to components having the same functions in the drawings, and overlapped description will be omitted.

Extended Role Play-Based Utterance Set Generation Apparatus and Method

Figure 1:
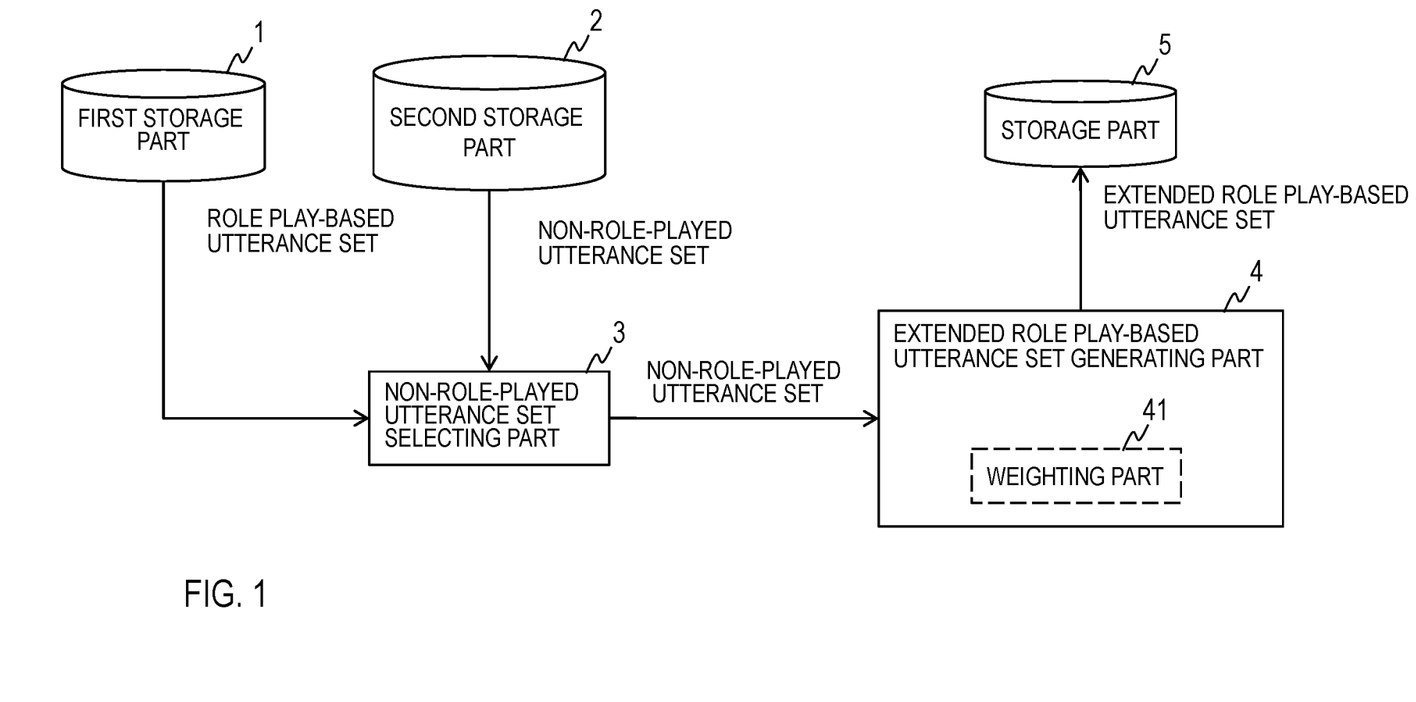
FIG. 1 is a view illustrating an example of a functional configuration of an extended role play-based utterance set generation apparatus.

As illustrated in FIG. 1, an extended role play-based utterance set generation apparatus includes, for example, a first storage part 1, a second storage part 2, an role play-based utterance set selecting part 3, an extended role play-based utterance set generating part 4, and a storage part 5.

Figure 2:
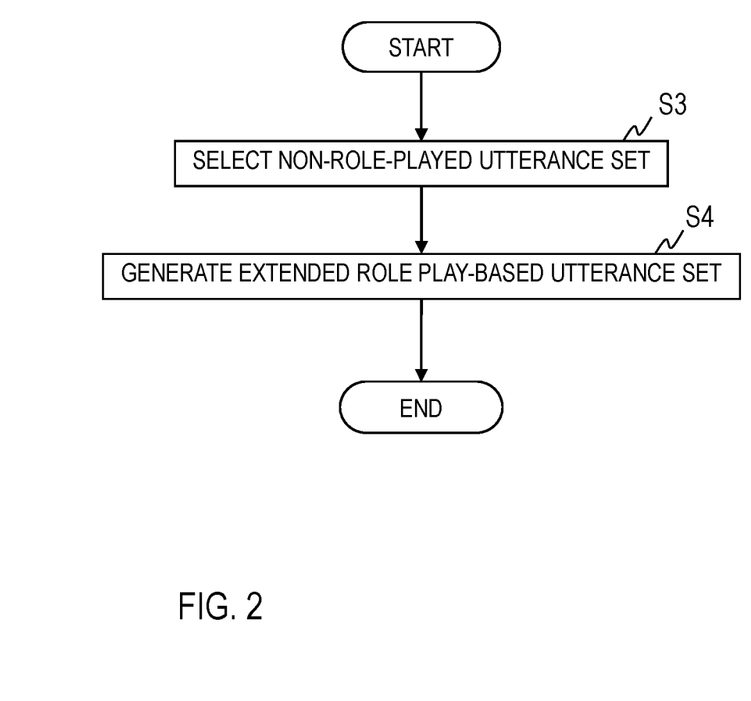
FIG. 2 is a view illustrating an example of a processing procedure of an extended role play-based utterance set generation method.

An extended role play-based utterance set generation method is realized by, for example, respective components of the extended role play-based utterance set generation apparatus performing processing described below and from step S3 to step S4 illustrated in FIG. 2.

The respective components of the extended role play-based utterance set generation apparatus will be described below.

First Storage Part 1

In the first storage part 1, I role play-based utterance sets $i=(t_i(1), t_i(2))$ $(i=1, \ldots, I)$ are stored.

I is a predetermined positive integer. For example, I is an integer equal to or greater than 2. The role play-based utterance set i includes two pieces of utterance of first utterance $t_i(1)$ and second utterance $t_i(2)$ which is associated with the first utterance $t_i(1)$ and which is made to the first utterance $t_i(1)$ while a predetermined character is role-played.

For example, the first utterance is utterance of a question, and the second utterance is utterance of a response to the question.

Note that the role play-based utterance set i may be stored in the first storage part 1 along with utterance IDs for identifying the first utterance $t_i(1)$ and the second utterance $t_i(2)$.

An example of the first utterance $t_i(1)$ and the second utterance $t_i(2)$ is $(t_i(1), t_i(2))=$("What is your favorite food?", "I'd eat anything as long as it's edible!"). Another example of the first utterance $t_i(1)$ and the second utterance $t_i(2)$ is $(t_i(1), t_i(2))=$("How was the battle of Kanegasaki-noki-kuchi?", "Even I was prepared to meet my end").

Collection of role play-based utterance sets to be stored in the first storage part 1 is performed through, for example, a website as follows. First, a website for having persons communicate while role playing a predetermined character such as an actual famous person (such as historical figure, an actor/actress and a narrator), and an imaginary character (such as a character in a novel and a cartoon character), in a form of questions and answers, is built. Then, on this website, a plurality of (for example, approximately 50, or more) people are asked to post answers to a predetermined question while they role play a predetermined character. Further, it is also possible to ask people to post the question itself as well as post answers, so that the posted question is included in the predetermined question for people who will post answers thereafter. A set of the predetermined question and respective answers posted for the question becomes a candidate for the role play-based utterance set. Note that IDs are provided to the respective answers to identify answers which are the second utterance $t_i(2)$.

Then, in a case where there exists, for example, a second utterance set which has a "character string of an answer" which is similar to or the same as a "character string of an answer" of a certain utterance set (hereinafter, a first utterance set), and which is different from the first utterance set, among the "set of the predetermined question and the respective answers posted for the question", each of the first utterance set and the second utterance set may be stored in the first storage part 1 as the "role play-based utterance set". Alternatively, for example, in a case where there exists a second utterance set which has a "character string of a predetermined question" which is similar to or the same as a "character string of a predetermined question" of the first utterance set, which has a "character string of an answer" which is similar to or the same as a "character string of an answer" of the first utterance set, and which is different from the first utterance set, for each of the "predetermined question" and the "answers" posted for the question of the first utterance set, each of the first utterance set and the second utterance set may be stored in the first storage part 1 as the "role play-based utterance set". In other words, among the "set of the predetermined question and the respective answers posted for the question", an utterance set in which there are two or more sets for which the "answers" are similar or the same, or both the "questions" and the "answers" are similar or the same, may be stored in the first storage part 1 as the "role play-based utterance set". Here, similar means that similarity between character strings satisfies a predetermined criterion. For example, if the "answers" are similar, it means that similarity between character strings of arbitrary two answers exceeds a predetermined criterion. For example, if both the "questions" and the "answers" are similar, it means that a value obtained by performing arithmetic mean (or square mean) on similarity A between character strings of arbitrary two predetermined questions, and similarity B between character strings of two answers respectively to the two predetermined questions exceeds a predetermined criterion, or both the similarity A and the similarity B exceed the predetermined criterion. Definition and examples of the similarity will be described later. In this manner, by setting a candidate for the role play-based utterance set in which there is a candidate for the role play-based utterance set in which the "answers" are similar or the same, or both the "questions" and the "answers" are similar or the same among candidates for the role play-based utterance set, as the "role play-based utterance set", it is possible to exclude data maliciously answered by causing erroneous data to be learned, or the like. By this means, it is possible to improve correctness of data.

Note that it is also possible to allow assessment of the respective posted answers as to personality of a predetermined character to be voted on. The assessment of a certain answer which is the posted second utterance $t_i(2)$ as to personality of a predetermined character is stored in the first storage part 1 along with the role play-based utterance set i of the second utterance $t_i(2)$.

Among the "set of the predetermined question and the respective answers which are posted in this manner", the "number of pieces of data" obtained by counting the number of sets which are similar or the same may be stored in the first storage part 1 in association with the role play-based utterance set.

Figure 3:
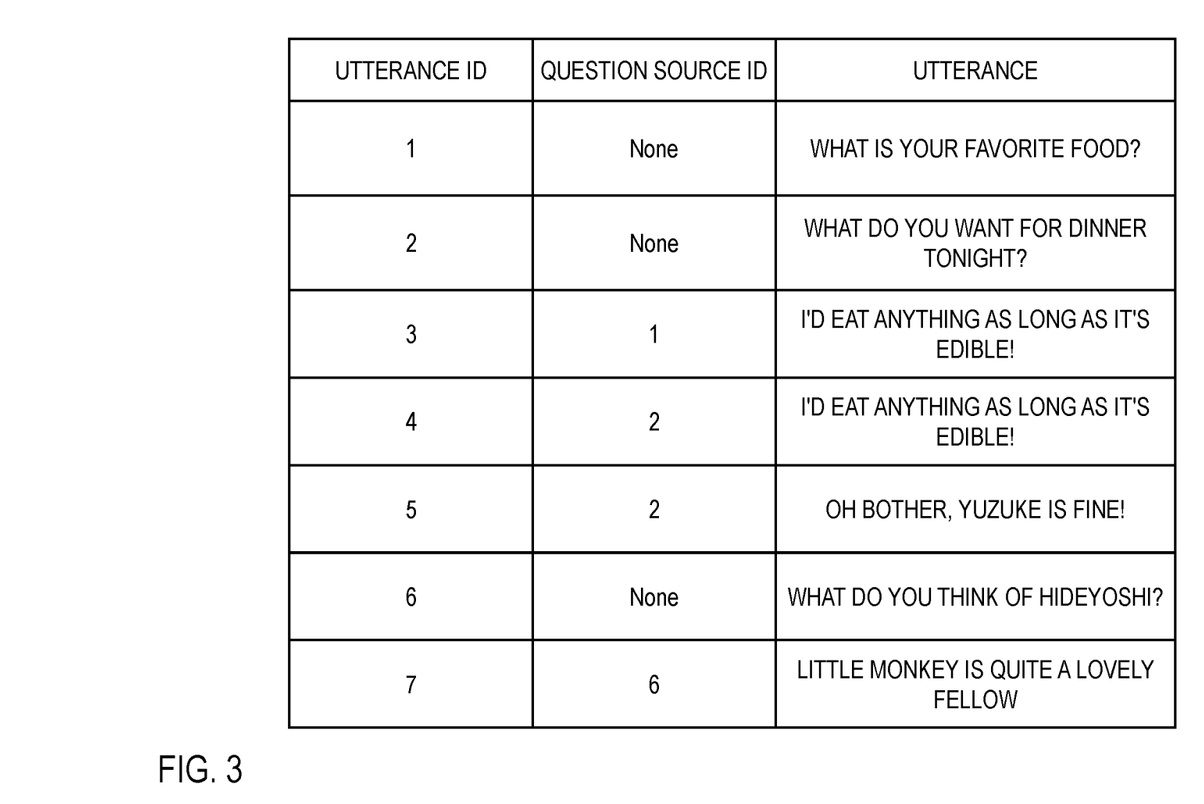
FIG. 3 is a view illustrating an example of IDs of first utterance and second utterance.

Note that the IDs for identifying the first utterance $t_i(1)$ and the second utterance $t_i(2)$ which are a candidate for the role play-based utterance set immediately after being collected from the above-described website are provided, for example, as will be described in FIG. 3 and below. First, utterance IDs are respectively provided to pieces of utterance including the first utterance $t_i(1)$ and the second utterance $t_i(2)$. Further, in a case where the utterance is the second utterance $t_i(2)$, a question source ID is further provided. In a case where the utterance is the first utterance $t_i(1)$, because the utterance is a question itself, the question source ID is not provided. Therefore, in FIG. 3, "None" is described in a field of the question source ID in a case where the utterance is the first utterance $t_i(1)$. Note that because the first utterance $t_i(1)$ can correspond to the second utterance $t_i(2)$ only on a one-to-one basis, there is a case where different question source IDs are provided for a plurality of pieces of second utterance $t_i(2)$ whose utterance content is the same. In FIG. 3, question source IDs of 1 and 2 are respectively provided to the second utterance $t_i(2)$ whose utterance IDs are 3 and 4, and whose utterance content is the same and "I'd eat anything as long as it's edible!".

Figure 4:
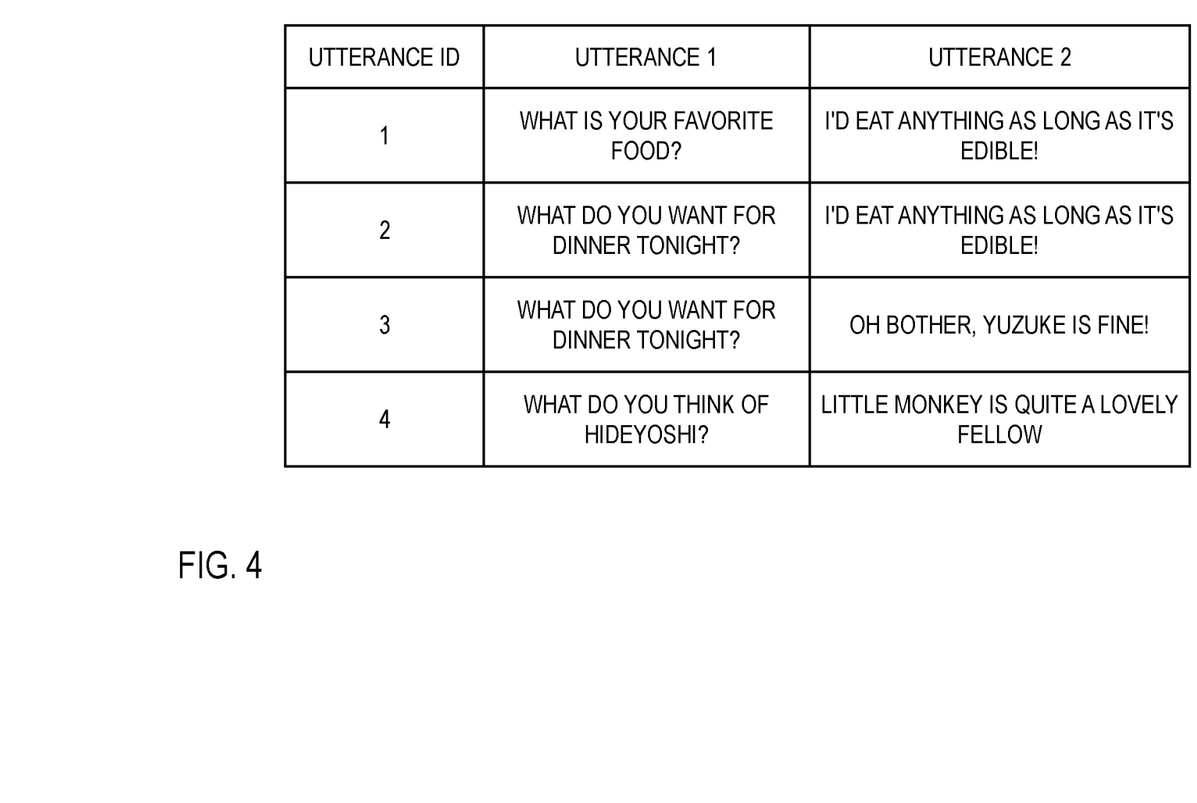
FIG. 4 is a view illustrating an example of role play-based utterance sets stored in a first storage part 1.

As described above, while an utterance set which appears more than once in candidates for the role play-based utterance set is stored in the first storage part 1 as the role play-based utterance set, in which case, utterance IDs for identifying the first utterance $t_i(1)$ and the second utterance $t_i(2)$ of the role play-based utterance set i are provided, for example, as illustrated in FIG. 4. In FIG. 4, utterance IDs newly starting from 1 are provided to the role play-based utterance sets.

Processing in step S3 and subsequent step which will be described later is performed for each piece of the second utterance $t_i(2)$.

Second Storage Part 2

In the second storage part 2, J non-role-played utterance sets $j=(t'_j(1), t'_j(2))$ (j=1, ..., J) are stored.

J is a predetermined positive integer. For example, J is an integer equal to or greater than 2.

A non-role-played utterance set includes two pieces of utterance of first utterance $t'_j(1)$ and second utterance $t'_j(2)$ which is associated with the first utterance $t'_j(1)$ and which is made to the first utterance $t'_j(1)$.

An example of the first utterance $t'_j(1)$ and the second utterance $t'_j(2)$ is $(t'_j(1), t'_j(2))$=("What do you want for dinner tonight?", "I'll eat anything as long as it's edible!"). Another example of the first utterance $t'_j(1)$ and the second utterance $t'_j(2)$ is $(t'_j(1), t'_j(2))$=("Yesterday's earthquake was scary, wasn't it?", "Even I was prepared to meet my death").

Note that information as to the non-role-played utterance set j can be obtained from a website such as, for example, Twitter (registered trademark) on which communication of dialogue is expressed in text.

Non-Role Play-Based Utterance Set Selecting Part 3

To the non-role-played utterance set selecting part 3, the second utterance $t_i(2)$ of the role play-based utterance set i read from the first storage part 1, and the non-role-played utterance set j read from the second storage part 2 are input.

The non-role-played utterance set selecting part 3 selects from the second storage part 2, one or more non-role-played utterance sets j corresponding to the second utterance $t'_j(2)$ which is the same as or similar to the second utterance $t_i(2)$ of each of the role play-based utterance sets i read from the first storage part 1 (step S3).

The selected non-role-played utterance sets j are output to the extended role play-based utterance set generating part 4.

For example, n non-role-played utterance sets $(t'_1(1), t'_1(2)), (t'_n(1), t'_n(2))$ are selected as the non-role-played utterance sets corresponding to the second utterance $t'_j(2)$ which is the same as or similar to the second utterance $t_i(2)$, where n is a positive integer equal to or greater than 1 and equal to or less than J.

The second utterance $t'_j(2)$ which is the same as or similar to the second utterance $t_i(2)$ is the second utterance $t'_j(2)$ whose similarity with the second utterance $t_i(2)$ exceeds a predetermined criterion.

The similarity is an index such as the Levenshtein distance, the normalized Levenshtein distance, the COS similarity, and the Word Movers Distance, which indicates closeness between character strings which constitute utterance. The similarity only requires to be an index indicating closeness between character strings, and is not limited to the Levenshtein distance, the normalized Levenshtein distance, the COS similarity, and the Word Movers Distance.

Exceeding a predetermined criterion means that similarity is smaller than a predetermined criterion value in a case of using similarity which indicates higher similarity as a value is smaller, and means that similarity is greater than a predetermined criterion value in a case of using similarity which indicates higher similarity as a value is greater.

Description will be provided below using an example in a case where the similarity is the normalized Levenshtein distance.

The Levenshtein distance is a minimum number of times of operations required for converting one character string into another character string through insertion, deletion, or substitution of one character. Insertion of one character and deletion of one character are counted as one time of an operation, and substitution of one character is counted as two times of operations. In contrast, the normalized Levenshtein distance is a value obtained by dividing the Levenshtein distance by the number of characters of a longer character string out of two character strings. In other words, the normalized Levenshtein distance $NLD(r, r')$ of a character string r and a character string r' is $NLD(r, r')=$(Levenshtein distance of r and r')$/\max(|r|, |r'|)$. Here, $|r|$ is the number of characters of the character string r, and $|r'|$ is the number of characters of the character string r'. The normalized Levenshtein distance becomes a value equal to or greater than 0 and equal to or less than 1. The Levenshtein distance and the normalized Levenshtein distance indicate that similarity is higher as the value is smaller.

For example, it is assumed that two character strings r, r' are r="ice cream", and r'="dry ice". In this case, the Levenshtein distance and the normalized Levenshtein distance of the two character strings r, r' can be obtained as follows. The character string of "ice cream" can be converted into the character string of "dry ice" through deletion and insertion described below.
"ice cream"
Delete "m"
"ice crea"
Delete "a"
"ice cre"
Delete "e"
"ice cr"
Delete "r"
"ice c"
Delete "c"
"ice "
Delete a space after "e"
"ice"
Insert "d" before the first character
"dice"
Insert "r" before the second character
"drice"
Insert "y" before the third character
"dryice"
Insert a space before the fourth character
"dry ice"

In this manner, the character string of "ice cream" can be converted into the character string of "dry ice" through ten times of operations including six times of deletion and four times of insertion. Therefore, the Levenshtein distance of the character string of "ice cream" and the character string of "dry ice" is 10.

The number of characters |r| of the character string r of "ice cream" is 9, and the number of characters |r'| of the character string r' of "dry ice" is 7. Therefore, the normalized Levenshtein distance NLD(r, r')=(Levenshtein distance of r and r')/max(|r|, |r'|)=10/max(9, 7)=10/9≈1.11 . . . Given that similarity is higher as the normalized Levenshtein distance is closer to 0, it can be understood that the character string of "ice cream" is practically not similar to the character string of "dry ice".

It is assumed that two characters r, r' are r="chocolate-covered donut", and r'="chocolate topped donut". In this case, the character string of "chocolate-covered donut" can be converted into the character string of "chocolate-topped donut" through six times of operations including deletion of three characters: the eleventh character of "c"; the twelfth character of "v"; and the twelfth character of "e", insertion of "t" before the eleventh character, insertion of "p" before the thirteenth character, and insertion of "p" before the thirteenth character. Further, the number of characters of the character string of "chocolate-covered donut" is 23, and the number of characters of the character string of "chocolate-topped donut" is 22. Therefore, in this case, the normalized Levenshtein distance NLD(r, r')=6/23=0.26. Therefore, the character string of "chocolate-covered donut" is relatively similar to the character string of "chocolate-topped donut".

In a case where the normalized Levenshtein distance is used as the similarity, the non-role-played utterance set selecting part 3 selects from the second storage part 2, one or more non-role-played utterance sets j corresponding to the second utterance $t'_j(2)$ whose normalized Levenshtein distance with the second utterance $t_i(2)$ is smaller than a predetermined criterion value. The predetermined criterion value in this case is a value greater than 0 and smaller than 1, and is, for example, 0.1.

For example, it is assumed that the second utterance $t_i(2)$="I'd eat anything as long as it's edible!", and the predetermined criterion value=0.2. Further, it is assumed that the non-role-played utterance set j of $(t'_j(1), t'_j(2))$= ("What do you want for dinner tonight?", "I'll eat anything as long as it's edible!") is stored in the storage part 2.

First, description will be provided in a case of Japanese.

The character string of "Ku-e-re-ba nan-de-mo yo-i-wa!" can be converted into the character string of "Ku-e-re-ba nan-de-mo i-i-wa!" through two times of operations of deletion of the eighth character of "yo" and insertion of "i" before the eighth character, or one time of an operation of substitution of "i" for "yo" of the eighth character. Therefore, the Levenshtein distance of the character string of "Ku-e-re-ba nan-de-mo yo-i-wa!" and the character string of "Ku-e-re-ba nan-de-mo i-i-wa!" is 2. Further, the number of characters of the character string of "Ku-e-re-ba nan-de-mo yo-i-wa!" and the number of characters of the character string of "Ku-e-re-ba nan-de-mo i-i-wa!" are 11. Therefore, the normalized Levenshtein distance of the character string of "Ku-e-re-ba nan-de-mo yo-i-wa!" and the character string of "Ku-e-re-ba nan-de-mo i-i-wa!" is 2/11≈0.18. Because 0.18<0.2, the non-role-played utterance sentence selecting part 3 selects a non-role-played utterance set j of $(t'_j(1), t'_j(2))$=("What do you want for dinner tonight?", "Ku-e-re-ba nan-de-mo i-i-wa!") as the non-role-played utterance set j corresponding to the second utterance $t'_j(2)$ whose normalized Levenshtein distance with the second utterance $t_i(2)$ = "Ku-e-re-ba nan-de-mo yo-i-wa!" is smaller than the predetermined criterion value of 0.2.

Description will be provided next in a case of English.

The character string of "I'd eat anything as long as it's edible!" can be converted into the character string of "I'll eat anything as long as it's edible!" through three times of operations of deletion of the third character of "d", insertion of "l" before the third character, and insertion of "l" before the third character. Therefore, the Levenshtein distance of the character string of "I'd eat anything as long as it's edible!" and the character string of "I'll eat anything as long as it's edible!" is 3. Further, the number of characters of the character string of "I'll eat anything as long as it's edible!" is 42, and the number of characters of the character string of "I'd eat anything as long as it's edible!" is 41. Therefore, the normalized Levenshtein distance of the character string of "I'd eat anything as long as it's edible!" and the character string of "I'll eat anything as long as it's edible!" is 3/42≈0.071. Because 0.071<0.2, the non-role-played utterance set selecting part 3 selects a non-role-played utterance set j of $(t'_j(1), t'_j(2))$=("What do you want for dinner tonight?", "I'll eat anything as long as it's edible!") as the non-role-played utterance set j corresponding to the second utterance $t'_j(2)$ whose normalized Levenshtein distance with the second utterance $t_i(2)$="I'd eat anything as long as it's edible!" is smaller than the predetermined criterion value of 0.2.

In a case where assessment as to personality of a predetermined character is provided to the second utterance $t_i(2)$ stored in the first storage part 1, the non-role-played utterance set selecting part 3 may perform the above-described processing in step S3 by preferentially using the role play-based utterance set i of the second utterance $t_i(2)$ for which assessment as to personality of a predetermined character is high. For example, the non-role-played utterance set selecting part 3 may perform the above-described processing in step S3 on only the role play-based utterance set i of the second utterance $t_i(2)$ for which assessment as to personality of a predetermined character is equal to or higher than a predetermined criterion value.

Extended Role Play-Based Utterance Set Generating Part 4

To the extended role play-based utterance set generating part 4, one or more non-role-played utterance sets selected at the non-role-played utterance set selecting part 3 are input.

The extended role play-based utterance set generating part 4 associates the first utterance $t'_j(1)$ of each of the non-role-played utterance sets j selected at the non-role-played utterance set selecting part 3 with the second utterance $t_i(2)$ of the role play-based utterance set i to make an extended role play-based utterance set $(t'_j(1), t_i(2))$, and outputs the extended role play-based utterance set $(t'_j(1), t_i(2))$.

The generated extended role play-based utterance set is stored in the storage part 5. Processing of storing the generated extended role play-based utterance set in the storage part 5 is performed at an arbitrary timing. In other words, the processing of storing the generated extended role play-based utterance set in the storage part 5 may be performed every time the extended role play-based utterance set is generated, may be performed after all of one or more extended role play-based utterance sets for certain second utterance $t_i(2)$ are generated, or may be performed only once after all of one or more extended role play-based utterance sets are respectively generated for a plurality of pieces of second utterance $t_i(2)$.

For example, it is assumed that n non-role-played utterance sets $(t'_1(1), t'_1(2)), \ldots, (t'_n(1), t'_n(2))$ are selected at the non-role-played utterance set selecting part 3 as the non-role-played utterance set j corresponding to the second utterance $t'_j(2)$ which is the same as or similar to the second utterance $t_i(2)$. In this case, by $t'_j(1)$ being respectively associated with $t_i(2)$, n extended role play-based utterance sets $(t'_1(1), t_i(2)), \ldots, (t'_n(1), t_i(2))$ are generated.

For example, it is assumed that one non-role-played utterance set of $(t'_j(1), t'_j(2))=$("What will you eat if you are a bit hungry?", "I'll eat anything as long as it's edible!") is selected at the non-role-played utterance set selecting part 3 as the non-role-played utterance set j corresponding to the second utterance $t'_j(2)$ which is the same as or similar to the second utterance $t_i(2)=$"I'd eat anything as long as it's edible!". In this case, by the first utterance $t'_j(1)=$"What will you eat if you are a bit hungry?" being associated with the second utterance $t_i(2)=$"I'd eat anything as long as it's edible!", one extended role play-based utterance set of $(t'_j(1), t_i(2))=$("What will you eat if you are a bit hungry?", "I'd eat anything as long as it's edible!") is generated.

In an approach for improving quality of the dialogue system which has been proposed so far, appropriateness of the second utterance which is a response to the first utterance has been considered. In contrast, in an approach of the above-described embodiment, it is considered to expand the range of the first utterance which can be covered by the second utterance $t_i(2)$. The approach of the above-described embodiment is different from the approach which has been proposed so far in this point.

The approach of the above-described embodiment has an advantage that even if the range of the first utterance which can be covered by the second utterance $t_i(2)$ is expanded in this manner, because the second utterance which is a response is the second utterance $t_i(2)$ itself of the role play-based utterance set obtained by a predetermined character being role-played, personality of the predetermined character is not lost.

Modified Examples of Extended Role Play-Based Utterance Set Generation Apparatus and Method Modified Example 1

The extended role play-based utterance set generating part 4 may include a weighting part 41 which provides larger weight to an extended role play-based utterance set including the same second utterance $t_i(2)$ as the number of pieces of the same second utterance $t_i(2)$ is larger in the second utterance $t_i(2)$ stored in the first storage part 1.

In this case, in a dialogue apparatus and method which will be described later, the extended role play-based utterance set to which larger weight is provided is preferentially used.

It can be said that, as the number of pieces of the same second utterance $t_i(2)$ is larger in the second utterance $t_i(2)$ stored in the first storage part 1, the same second utterance $t_i(2)$ expresses personality of a predetermined character more properly. Therefore, by providing larger weight to the extended role play-based utterance set including the same second utterance $t_i(2)$ as the number of pieces of the same second utterance $t_i(2)$ is larger in the second utterance $t_i(2)$ stored in the first storage part 1 and causing the extended role play-based utterance set to be preferentially used at the dialogue apparatus and method, utterance generated by the dialogue apparatus and method expresses personality of the predetermined character more properly.

For example, it is assumed that, in the second utterance $t_i(2)$ stored in the first storage part 1, the second utterance $t_i(2)$ of "I'd eat anything as long as it's edible!" appears ten times, the second utterance $t_i(2)$ of "I'd eat anything as long as it's sweet!" appears three times, and the second utterance $t_i(2)$ of "Castella is yummy!" appears once.

In this case, the weighting part 41 may provide weight of $f(10)$ to the extended role play-based utterance set including the second utterance $t_i(2)$ of "I'd eat anything as long as it's edible!", may provide weight of $f(3)$ to the extended role play-based utterance set including the second utterance $t_i(2)$ of "I'd eat anything as long as it's sweet!", and may provide weight of $f(1)$ to the extended role play-based utterance set including the second utterance $t_i(2)$ of "Castella is yummy!", using f as a predetermined non-decreasing function.

Modified Example 2

The extended role play-based utterance set generating part 4 may include a weighting part 41 which provides larger weight to the same extended role play-based utterance sets as the number of the same extended role play-based utterance sets is larger in the extended role play-based utterance sets generated by the extended utterance set generating part 4.

In this case, in the dialogue apparatus and method which will be described later, the extended role play-based utterance set to which the larger weight is provided is preferentially used.

It can be said that, as the number of the same extended role play-based utterance sets is larger in the extended role play-based utterance sets generated by the extended role play-based utterance set generating part 4, correctness of the same extended role play-based utterance sets as a response is higher. Therefore, by providing larger weight to the same extended role play-based utterance sets as the number of the same extended role play-based utterance sets is larger in the extended role play-based utterance sets generated by the extended role play-based utterance set generating part 4 and causing the extended role play-based utterance sets to be preferentially used at the dialogue apparatus and method, correctness of utterance generated by the dialogue apparatus and method is increased.

Modified Example 3

It is also possible to combine the modified example 1 and the modified example 2.

In other words, the extended role play-based utterance set generating part 4 may include a weighting part 41 which provides larger weight to the extended role play-based utterance set including the same second utterance $t_i(2)$ as the number of pieces of the same second utterance $t_i(2)$ is larger in the second utterance $t_i(2)$ stored in the first storage part 1, and provides larger weight to the same extended role play-based utterance sets as the number of the same extended role play-based utterance sets is larger in the extended role play-based utterance sets generated by the extended role play-based utterance set generating part 4.

By combining the modified example 1 and the modified example 2, it is possible to obtain effects of both the modified example 1 and the modified example 2. In other words, by combining the modified example 1 and the modified example 2, utterance generated by the dialogue apparatus and method expresses personality of predetermined character more properly and more correctly.

Dialogue Apparatus and Method

An embodiment of the dialogue apparatus and method will be described below. The dialogue apparatus and method generate and output utterance of a response to utterance which is an input question using at least the extended role play-based utterance set generated by the extended role play-based utterance set generation apparatus and method.

Figure 5:
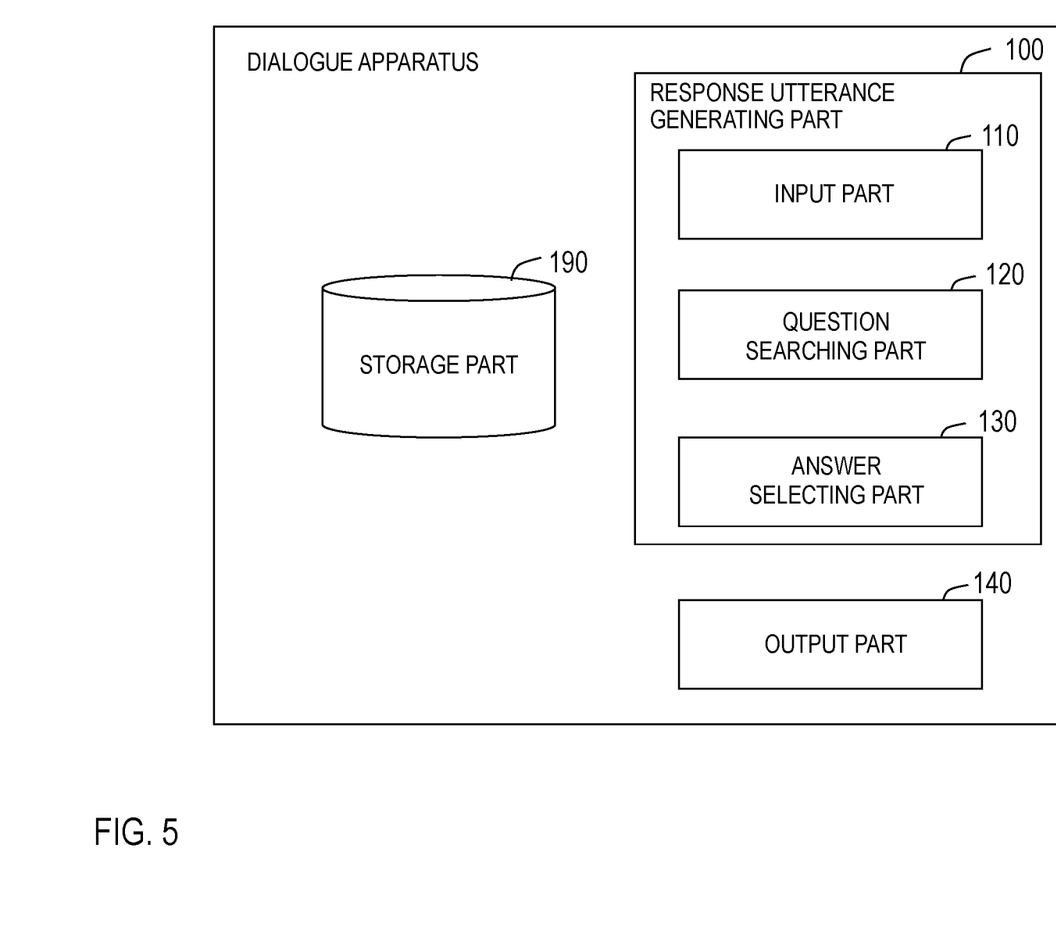
FIG. 5 is a view illustrating an example of a functional configuration of a dialogue apparatus.

As illustrated in FIG. 5, the dialogue apparatus includes, for example, a storage part 190 in which at least the extended role play-based utterance set generated by the extended role play-based utterance set generation apparatus and method is stored, a response utterance generating part 100 which generates utterance of a response to input utterance using at least the extended role play-based utterance set stored in the storage part 190, and an output part 140. The response utterance generating part 100 includes, for example, an input part 110, a question searching part 120 and an answer selecting part 130.

Figure 6:
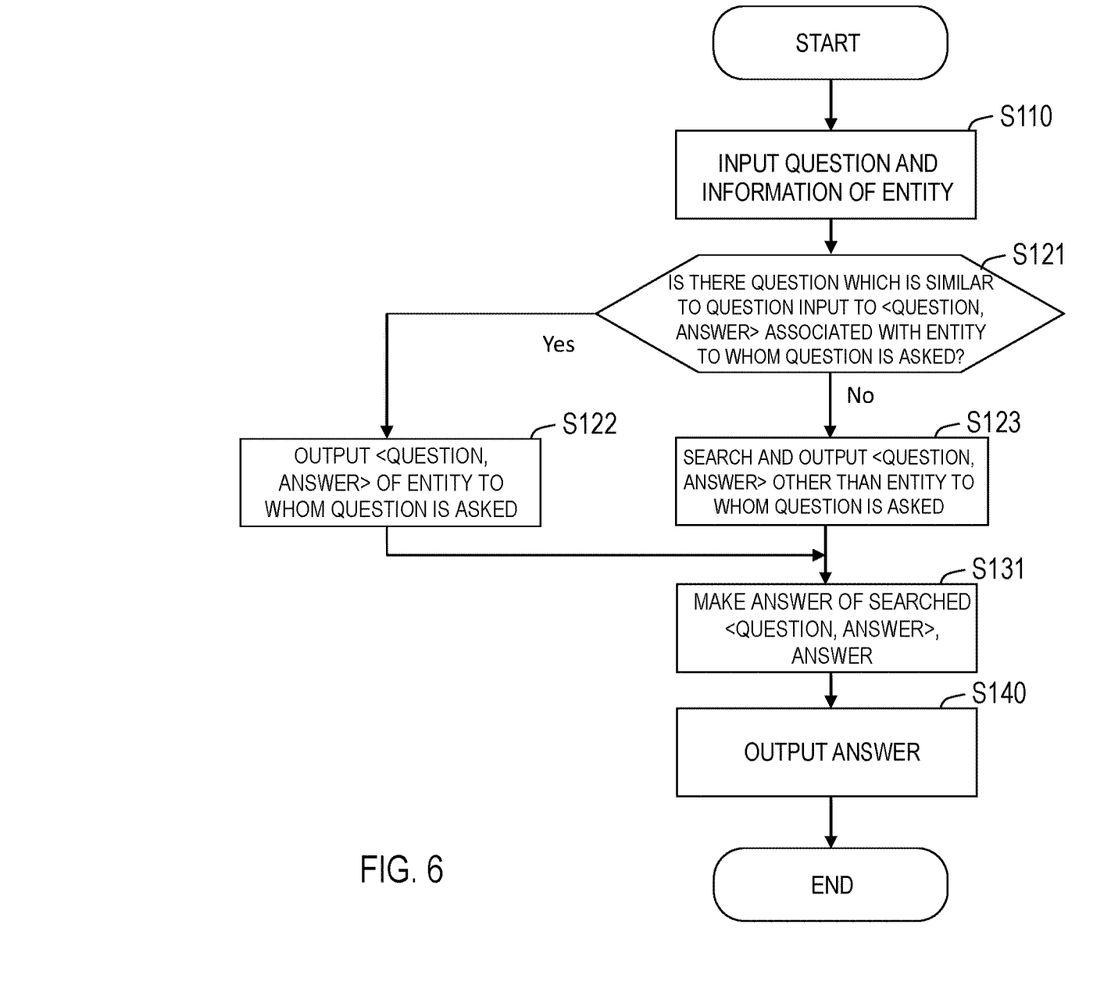
FIG. 6 is a view illustrating an example of a processing procedure of a dialogue method.

The dialogue method is realized by, for example, the respective components of the dialogue apparatus performing processing described below and from step S110 to step S140 illustrated in FIG. 6.

Figure 7:
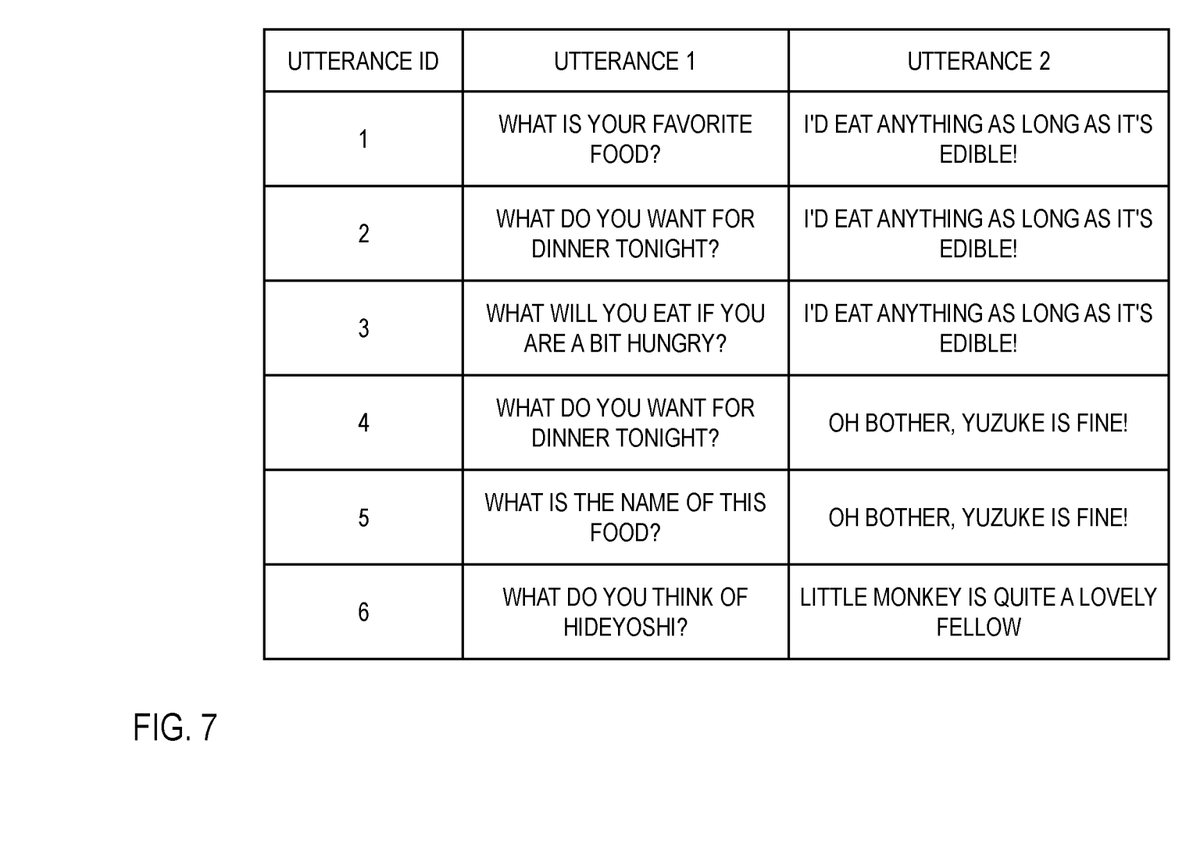
FIG. 7 is a view illustrating an example of utterance sets stored in the storage part 190.

In the storage part 190, <question, answer> which is a combination of a question to a plurality of entities having personality in answers to the question, and answers, is stored in association with the entities. Here, the entity is a character. It is assumed that, as the <question, answer>, the role play-based utterance sets stored in the first storage part 1 of the extended role play-based utterance set generation apparatus, and the extended role play-based utterance sets generated by the extended role play-based utterance set generation apparatus and method are stored in the storage part 190. For example, as illustrated in FIG. 7, in the storage part 190, utterance sets including the role play-based utterance sets and the extended role play-based utterance sets are stored along with utterance IDs. In an example of FIG. 7, utterance IDs=1, 2, 4, 6 are utterance sets derived from the role play-based utterance set, and utterance IDs=3, 5 are utterance sets derived from the extended role play-based utterance set.

To the input part 110, information for specifying at least a question and an entity to whom the question is asked is input (step S110). The question searching part 120 confirms whether a similar question to the entity (designated entity) to whom the question is asked, is recorded in the storage part 190 (step S121). A similar question means a question to which an appropriate answer can be obtained, and only requires to be a question having similarity equal to or higher than a threshold. As the similarity, an index indicating closeness between character strings, such as the Levenshtein distance, the normalized Levenshtein distance, the COS similarity and the Word Movers Distance can be used. The similarity used here does not have to be the same as the index used in generation of the extended role play-based utterance set described above. In a case where a question to the entity to whom the question is asked is recorded (in a case where step S121: Yes), the question searching part 120 outputs <question, answer> which is similar to the input question (step S122).

In a case where a question to the entity to whom the question is asked is not recorded in the storage part 190 (in a case where step S121: No), the question searching part 120 performs processing of one of the following (Case 1) to (Case 3).

In (Case 1), the question searching part 120 outputs an answer if even one word is recorded. In other words, if there is a question including one of word strings included in the input question, in the questions corresponding to the designated entity recorded in the storage part 190, the question searching part 120 outputs <question, answer> corresponding to the question.

(Case 2) is a case where the question searching part 120 answers using a typical existing question and answer system.

(Case 3) is a case where the question searching part 120 searches for a question having the highest similarity among the questions to entities other than the entity to whom the question is asked, recorded in the storage part 190 and outputs <question, answer> (step S123). More specifically, similarity between a question Q and a question Q' is calculated for the question Q' associated with entities other than the entity received from the input part 110 among the questions accumulated in the storage part 190. For example, the COS similarity sim(Q, Q') of word sets included in the respective questions can be used to calculate the similarity. As the similarity, a distance scale using a character as unit, such as the Levenshtein distance and the normalized Levenshtein distance, may be used other than the COS similarity.

The question searching part 120 outputs a pair of <question, answer> including a question having the greatest value of similarity.

The answer selecting part 130 selects an answer of <question, answer> output by the question searching part 120 as an answer to the question (step S131).

The output part 140 outputs utterance of the selected answer (step S140). The output utterance of the answer is presented to a user.

Note that there is a case where a plurality of answers correspond to one input question. The answer selecting part 130 confirms whether there are a plurality of answers to one input question after the processing in step S122, and, in a case where there is only one answer, makes the answer an answer to the input question. In a case where there are a plurality of answers to one input question, the answer selecting part 130 makes one of these answers an answer to the input question. In this case, because all the answers are recorded as answers of the entity to whom the question is asked, one of the answers may be, for example, randomly selected. In a case where weight is provided to the extended role play-based utterance set, it is also possible to select an answer with the largest weight.

Further, after step S123 (in a case where step S121: No), the answer selecting part 130 confirms whether there are a plurality of answers to one input question, and, in a case where there is only one answer, makes the answer an answer to the input question. In a case where there are a plurality of answers to the one input question, the answer selecting part 130 only requires to, for example, randomly select one of them. In a case where the number of pieces of data of the role play-based utterance sets is stored in the first storage part 1, and the number of pieces of data is succeeded to the extended role play-based utterance set, it is also possible to select an answer with the largest number of pieces of data, because it can be considered that the answer with the large number of pieces of data has high versatility as the answer to the question.

Note that, in the dialogue apparatus and method, an extended role play-based utterance set to which larger weight is provided may be preferentially used. For example, it is also possible to perform the above-described processing from step S110 to step S140 using only extended role play-based utterance sets whose provided weight is equal to or greater than a predetermined criterion value.

Note that, in the dialogue apparatus and method, in a case where there can be a plurality of answers to the same question, it is possible to avoid duplicate answers by reducing weight of the extended role play-based utterance set which has been used as the response once.

For example, it is assumed that the extended role play-based utterance set of ("What do you want for dinner tonight?", "I'd eat anything as long as it's edible!") to which the largest weight is provided has already been used to a question of "What is your favorite food?" In this case, at a time point at which the extended role play-based utterance set of ("What do you want for dinner tonight?", "I'd eat anything as long as it's edible!") is used, weight provided to the extended role play-based utterance set of ("What do you want for dinner tonight?", "I'd eat anything as long as it's edible!") is reduced. By this means, by reducing the weight provided to the extended role play-based utterance set of ("What do you want for dinner tonight?", "I'd eat anything as long as it's edible!") and generating an answer using the utterance set to which the largest weight is provided when a question of "What is your favorite food?" is asked thereafter, it is possible to make an extended role play-based utterance set which has not been used in dialogue including the second utterance $t_r(2)$ of "I'd eat anything as long as it's sweet", that is, an extended role play-based utterance set other than the extended role play-based utterance set of "What do you want for dinner tonight?", "I'd eat anything as long as it's edible!" which has been used, easier to be used.

In this manner, in the dialogue system and method, the weight provided to the extended role play-based utterance set may be able to be adjusted.

Other Modified Examples

While the embodiment of the present invention and the modified examples have been described above, it goes without saying that a specific configuration is not limited to these embodiment and modified examples, and appropriate design change, or the like, within the scope not deviating from the gist of the present invention is included in the present invention.

Various kinds of processing described in the embodiment and the modified examples are not only executed in chronological order in accordance with description order, but also may be executed in parallel or individually in accordance with processing performance of an apparatus which executes the processing or as necessary.

Program, Recording Medium

In a case where various processing functions at the respective apparatuses described above are realized with a computer, a processing content of the functions which should be provided at the respective apparatuses is described with a program. Then, by this program being executed at the computer, the above-described various kinds of processing at the respective apparatuses are realized on the computer.

The program describing this processing content can be recorded in a computer-readable recording medium. As the computer-readable recording medium, any medium such as, for example, a magnetic recording apparatus, an optical disk, a magnetooptical recording medium, and a semiconductor memory can be used.

Further, this program is distributed by, for example, a portable recording medium such as a DVD and CD-ROM in which the program is recorded being sold, given, lent, or the like. Still further, it is also possible to employ a configuration where this program is distributed by the program being stored in a storage apparatus of a server computer and transferred from the server computer to other computers via a network.

A computer which executes such a program, for example, first, stores a program recorded in the portable recording medium or a program transferred from the server computer in the storage apparatus of the own computer once. Then, upon execution of the processing, this computer reads the program stored in the storage apparatus of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by a so-called ASP (Application Service Provider) type service which realizes processing functions only by an instruction of execution and acquisition of a result without the program being transferred from the server computer to this computer. Note that, it is assumed that the program in the present embodiment includes information which is to be used for processing by an electronic computer, and which is equivalent to a program (not a direct command to the computer, but data, or the like, having property specifying processing of the computer).

Further, while, in this embodiment, the present apparatus is constituted by a predetermined program being executed on the computer, at least part of the processing content may be realized with hardware.

Experimental Result

To confirm effects provided by the proposed approach, case analysis, quantitative assessment, and subjective assessment through incorporation into an actual dialogue system were performed.

It is assumed that a predetermined person who is a target to be role-played is a character in a novel or a cartoon character.

For example, it is assumed that, in a case where the predetermined person who is a target to be role-played is Ieyasu Tokugawa, examples of the role play-based utterance sets stored in the first storage part 1 are $(t_i(1), t_i(2))$=("If you don't sing for me, I'll wait till you sing?", "Little cuckoo"), $(t_i(1), t_i(2))$=("What is your favorite food?", "I'm partial to tai"), and $(t_i(1), t_i(2))$=("Where is buried gold?", "Mum's the word").

It is assumed that examples of the non-role-played utterance sets stored in the second storage part 2 are $(t'_i(1), t'_i(2))$=("What is your favorite bird?", "Little cuckoo . . . "), $(t'_i(1), t'_i(2))$=("What is your favorite sushi topping?", "I like tai!"), and $(t'_i(1), t'_i(2))$=("How many points did you get in the today's practice exam?", "That's a secret").

Through the proposed approach, for example, the extended role play-based utterance sets of ("What is your favorite bird?", "Little cuckoo"), ("What is your favorite sushi topping?", "I'm partial to tai"), and ("How many points did you get in the today's practice exam?", "Mum's the word") are obtained.

It can be understood that, through the proposed approach, the extended role play-based utterance sets including a pair of the second utterance of the role play-based utterance set and the first utterance of the non-role-played utterance set in which the second utterance can be utilized, are obtained. For example, the extended role play-based utterance set of ("What is your favorite bird?", "Little cuckoo") is a pair of the second utterance of the role play-based utterance set of $(t_i(1), t_i(2))$=("If you don't sing for me, I'll wait till you sing?", "Little cuckoo"), and the first utterance of the non-role-played utterance set of $(t'_i(1), t'_i(2))$=("What is your favorite bird?", "Little cuckoo . . . ").

From these cases, it can be understood that the second utterance which has relatively high versatility among the role play-based utterance set is combined with the first utterance which does not exist in the role play-based utterance set, to make an extended role play-based utterance set as a new example.

As a result of the second utterance having high versatility among the role play-based utterance set which becomes a source being associated with a wide variety of first utterance, the second utterance of the role play-based utterance set is utilized in a wider variety of scenes, so that an effect is expected which can reduce cases where appropriate second utterance cannot be found for user input, which is a problem in preceding study.

Further, according to the proposed approach, an experiment was performed while a character in a novel or a cartoon character was made a target to be role-played. While the number of candidates for the role play-based utterance set was 13,669, and the number of role play-based utterance sets having two or more pieces of data was 311, 1,210,000 extended role play-based utterance sets could be obtained based on these. In this manner, the extended role play-based utterance sets of the number approximately hundred times of the number of role play-based utterance sets could be obtained. Further, also concerning the number of types of words, while the number of types of words of the role play-based utterance sets was 6,136 words, the number of types of words of utterance of the extended role play-based utterance sets was increased to 153,000 words.

In the subjective assessment experiment, two dialogue systems were constructed, and 26 subjects under examination assessed the output. Upon the subjective assessment, based on assessment conditions of the role play-based utterance set which was used as a source upon extension of an example, output sentences were respectively acquired from the respective dialogue systems using the first utterance of test data (which was 50 pieces of data extracted from the role play-based utterance set, and which was not used for extended examples and upon learning of the dialogue system) as an input, and naturalness of the second utterance with respect to the first utterance and personality of character were assessed.

The dialogue system used in the experiment is an example-based dialogue system using full-text search and reranking. First, an example having the first utterance which is the closest to the input sentence of the user was acquired using full-text search. Lucene 2 was utilized for this full-text search. Further, the second utterance was reranked using a question type of the example, a matching degree of full-text search, or the like, and the second utterance having the highest point was output. The two dialogue systems were different in targets for full-text search which was utilized and learning data of reranking, and while one dialogue system (hereinafter, an "role play-based dialogue system") utilized only the role play-based utterance set, while the other dialogue system (hereinafter, an "extended role play-based dialogue system") used both the role play-based utterance set and the extended role play-based utterance set.

In the role play-based dialogue system, naturalness of 3.04 points was obtained, and personality of character of 3.15 points was obtained. In contrast, in the extended role play-based dialogue system, naturalness of 3.23 points was obtained, and personality of character of 3.24 points was obtained. In this manner, higher naturalness and personality of character were obtained in a case where the extended role play-based dialogue set was used. Particularly, compared to a case where only the role play-based utterance set was used, assessment of naturalness was significantly increased (Steel-Dwass test, $p<0.05$) in a case where the extended role play-based utterance set was used. It was understood from these experimental results that, with the extended role play-based utterance set, a more natural response can be made while personality of character as high as that in a case where only the role play-based utterance set is used is maintained.

DESCRIPTION OF REFERENCE NUMERALS 1 first storage part
2 second storage part
3 utterance set selecting part
4 utterance set generating part
5 storage part

What is claimed is:
1. An extended role play-based utterance set generation apparatus comprising a processor configured to execute a method comprising:
   storing I role play-based utterance sets $i=(t_i(1), t_i(2))$ $(i=1, \ldots, I)$ in a first data store, where two pieces of utterance of first utterance $t_i(1)$ and second utterance $t_i(2)$ which is associated with the first utterance $t_i(1)$ and which is made to the first utterance $t_i(1)$ while a predetermined character is role-played, are an role play-based utterance set i, and I is a predetermined positive integer;

storing J non-role-played utterance sets j=(t'$_j$(1), t'$_j$(2)) (j=1, . . . , J) in a second data store, where two pieces of utterance of first utterance t'$_j$(1), and second utterance t'$_j$(2) which is associated with the first utterance t'$_j$(1) and which is made to the first utterance t'$_j$(1), are a non-role-played utterance set, and J is a predetermined positive integer;

selecting, one or more non-role-played utterance sets j corresponding to the second utterance t'$_j$(2) which is same as or similar to the second utterance t$_i$(2) of each of the role play-based utterance sets i; and generating a pair including the first utterance t'$_j$(1) of each of the selected non-role-played utterance sets j and the second utterance t$_i$(2) of each of the role play-based utterance sets i; and causing, based on the generated pair, extension to the role play-based utterance set i stored in the first data store.

2. The extended role play-based utterance set generation apparatus according to claim 1, wherein the second utterance t'$_j$(2) which is same as or similar to the second utterance t$_i$(2) is the second utterance t'$_j$(2) whose similarity with the second utterance t$_i$(2) exceeds a predetermined criterion.

3. The extended role play-based utterance set generation apparatus according to claim 1 or 2, wherein the generating the pair further comprises weighting a larger weight to an extended role play-based utterance set including same second utterance t$_i$(2) as a number of pieces of the same second utterance t$_i$(2) is larger in the stored second utterance t$_i$(2) stored in the first data store, and/or a larger weight to same extended role play-based utterance sets as a number of the same extended role play-based utterance sets is larger in the extended role play-based utterance sets.

4. A dialogue apparatus comprising a processor configured to execute a method comprising:

storing the extended role play-based utterance set generated by the extended role play-based utterance set generation apparatus according to claim 1; and generating a response utterance for input utterance using the extended role play-based utterance set stored in the storage part.

5. A non-transitory computer-readable recording medium storing computer-executable program instructions that when executed by a processor cause a computer to execute a method comprising:

storing I role play-based utterance sets i=(t$_i$(1), t$_i$(2)) (i=1, . . . , I) in a first data store, wherein two pieces of utterance of first utterance t$_i$(1) and second utterance t$_i$(2) which is associated with the first utterance t$_i$(1) and which is made to the first utterance t$_i$(1) are an role play-based utterance set i, and I is a predetermined positive integer, storing J non-role-played utterance sets j=(t'$_j$(1), t'$_j$(2)) (j=1, . . . , J) in a second data store, wherein two pieces of first utterance t'$_j$(1), and second utterance t'$_j$(2) which is associated with the first utterance t'$_j$(1) and which is made to the first utterance t'$_j$(1) are a non-role-played utterance set, and J is a predetermined positive integer;

selecting a non-role-played utterance set from the second data store, wherein one or more non-role-played utterance sets j corresponding to the second utterance t'$_j$(2) which is same as or similar to the second utterance t$_i$(2) of each of the role play-based utterance sets i read from the first data store;

generating a pair including the first utterance t'$_j$(1) of each of the selected non-role-played utterance sets j and the second utterance t$_i$(2) of each of the role play-based utterance sets I; and causing, based on the generated pair, extension to the role play-based utterance set stored in the first data store.

6. A computer implemented method for generating an utterance, comprising:

storing the extended role play-based utterance set according to claim 1 in the first data store, generating a response utterance for input utterance using at least the extended role play-based utterance set stored in the first data store.

7. A method for extending role play-based utterance set, comprising:

storing I role play-based utterance sets i=(t$_i$(1), t$_i$(2)) (i=1, . . . , I) in a first data store, wherein two pieces of utterance of first utterance t$_i$(1) and second utterance t$_i$(2) which is associated with the first utterance t$_i$(1) and which is made to the first utterance t$_i$(1) are an role play-based utterance set i, and I is a predetermined positive integer, storing J non-role-played utterance sets j=(t'$_j$(1), t'$_j$(2)) (j=1, . . . , J) in a second data store, wherein two pieces of first utterance t'$_j$(1), and second utterance t'$_j$(2) which is associated with the first utterance t'$_j$(1) and which is made to the first utterance t'$_j$(1) are a non-role-played utterance set, and J is a predetermined positive integer;

selecting a non-role-played utterance set from the second data store, wherein one or more non-role-played utterance sets j corresponding to the second utterance t'$_j$(2) which is same as or similar to the second utterance t$_i$(2) of each of the role play-based utterance sets i read from the first data store;

generating a pair including the first utterance t'$_j$(1) of each of the selected non-role-played utterance sets j and the second utterance t$_i$(2) of each of the role play-based utterance sets I; and causing, based on the generated pair, extension to the role play-based utterance set stored in the first data store.

* * * * *